(12) United States Patent
Minear

(10) Patent No.: US 8,195,124 B2
(45) Date of Patent: Jun. 5, 2012

(54) APPARATUS AND METHODS FOR MANAGING TIME SENSITIVE APPLICATION PRIVILEGES ON A WIRELESS DEVICE

(75) Inventor: Brian Minear, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1333 days.

(21) Appl. No.: 11/362,316

(22) Filed: Feb. 23, 2006

(65) Prior Publication Data

US 2007/0197197 A1 Aug. 23, 2007

(51) Int. Cl.
*H04M 1/66* (2006.01)
(52) U.S. Cl. ............ 455/410; 455/405; 455/414.1; 455/418; 705/59
(58) Field of Classification Search .......... 455/410, 455/411, 67.11, 414.1; 705/59
See application file for complete search history.

(56) References Cited

U.S. PATENT DOCUMENTS

| 6,157,825 | A * | 12/2000 | Frederick ............... 455/410 |
| 6,889,212 | B1 * | 5/2005 | Wang et al. ............. 705/59 |
| 2003/0060189 | A1 * | 3/2003 | Minear et al. .......... 455/411 |
| 2005/0198240 | A1 | 9/2005 | Widera et al. |
| 2006/0122939 | A1 * | 6/2006 | Cohen et al. ............ 705/59 |
| 2006/0194573 | A1 * | 8/2006 | Akiyama et al. ........ 455/414.3 |

FOREIGN PATENT DOCUMENTS

| EP | 1217850 | 6/2002 |
| EP | 1414210 | 4/2004 |

OTHER PUBLICATIONS

International Search Report and Written Opinion—PCT/US2007/062628—ISA/EPO—Jul. 26, 2007.

\* cited by examiner

*Primary Examiner* — Vladimir Magloire
(74) *Attorney, Agent, or Firm* — James T. Hagler

(57) ABSTRACT

Apparatus and methods for managing time sensitive application privileges on a wireless device include a computer platform operable to execute an application having a time sensitivity requirement. A time retrieval service resident on the computer platform is operable to retrieve a date/time result, which may be associated with a confidence factor. And, a date/time determination module resident on the computer platform is operable to determine whether or not to execute the application based on the date/time result and/or based on the confidence factor. Corresponding methods and computer readable media are also included.

58 Claims, 5 Drawing Sheets

APPARATUS AND METHODS FOR MANAGING TIME SENSITIVE APPLICATION PRIVILEGES ON A WIRELESS DEVICE

FIELD OF THE INVENTION

The described embodiments generally relate to wireless communications devices and computer networks. More particularly, the described embodiments relate to apparatus and methods of managing time sensitive application privileges on a wireless device.

BACKGROUND

Wireless devices, such as cellular telephones, communicate packets including voice and data over a wireless network. Wireless devices are being manufactured with increased computing capabilities and are becoming tantamount to personal computers. These "smart" wireless devices, such as cellular telephones, have installed application programming interfaces ("APIs") onto their local computer platform that allow software developers to create software applications that operate on the cellular telephone. The API sits between the wireless device system software and the software application, making the cellular telephone functionality available to the application without requiring the software developer to have the specific cellular telephone system source code.

The software applications can come pre-loaded at the time the cellular telephone is manufactured, or the user may later request that additional programs be downloaded over cellular telecommunication carrier networks, where the programs are executable on the wireless telephone. As a result, users of wireless telephones can customize their cellular telephones with programs, such as games, printed media, stock updates, news, or any other type of information or program available for download through the wireless network. Each of these software applications normally requires a license for the user to legally use the software on the wireless device.

If a license is meant to limit the use of the software application to a finite duration, such as a specific number of days of use, then once the license expires, a user of the wireless device must typically either download a new license to incorporate into the software application, or reinstall the entire software application if further use of the application is desired. The wireless device API normally checks the software either at the time execution is requested or at some other period to determine if the software is licensed for use on the platform. If the license has expired, then the wireless device will not execute the unlicensed software application. Thus, these types of licensing schemes rely on the wireless device having an accurate date/time setting in order to determine whether or not a license has expired.

In some networks, however, the date/time in the wireless device may not be established in a trustworthy fashion, thereby making time-based licensing decisions difficult or impossible. For example, some communication systems/protocols, such as GSM (Global System for Mobile Communications), TDMA (Time Division Multiple Access) and UMTS (Universal Mobile Telecommunications System), do not require time to be synchronized between the wireless device and the wireless network. As such, the date/time setting on the wireless device may be a setting input by a user of the device, or may be obtained from some other time service, such as NTP (Network Time Protocol). In any case, the API, or other logic on the wireless device responsible for determining the expiration of a time-based license, cannot verify the authenticity of the time/date setting on the wireless device in these systems.

Accordingly, it would be advantageous to provide a system that enables reliable time-based licensing decisions to be made on wireless devices operating on wireless networks that do not require time synchronization with the wireless device.

SUMMARY

To address one or more of the drawbacks of the prior art, the disclosed embodiments provide apparatus and methods for managing time sensitive application privileges on a wireless device. In one embodiment, the disclosed apparatus and methods determine whether or not to execute a time-sensitive application based on a given date/time result. In another embodiment, the disclosed apparatus and methods determine which one of a plurality of functional modes of an application to execute based on a given date/time result.

In one embodiment, a method of managing time sensitive application privileges on a wireless device comprises receiving a request to execute an application having a time sensitivity requirement and retrieving a date/time result. The method further includes determining execution of the application based on the date/time result.

In another embodiment, a computer-readable medium embodying means for managing time sensitive application privileges on a wireless device comprises at least one sequence of instructions, wherein execution of the instructions by a processor causes the processor to perform the acts of receiving a request to execute an application having a time sensitivity requirement and retrieving a date/time result. The acts further including associating a corresponding confidence factor with the date/time result, and determining execution of the application based on the confidence factor.

In yet another embodiment, a wireless device comprises a means for receiving a request to execute an application having a time sensitivity requirement and a means for retrieving a date/time result. Further, the wireless device includes a means for associating a corresponding confidence factor with the date/time result, and a means for determining execution of the application based on the confidence factor.

In still another embodiment, a wireless device comprises a computer platform operable to execute an application having a time sensitivity requirement. The wireless device further includes a time retrieval service resident on the computer platform and operable to retrieve a date/time result. Additionally, a date/time determination module is resident on the computer platform and is operable determine an execution of the application based on the date/time result.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

The described embodiments include apparatus, methods and computer readable media for the management of time-based licensing privileges on a wireless device. These apparatus, methods and computer readable medium provide a wireless device with logic that enables the wireless device to determine an authenticity and/or level of confidence associated with a given date/time result. In turn, this logic provides the wireless device with the ability to make decisions regarding the expiration of a time-sensitive license for an application executable on the wireless device. In addition, or alternatively, the logic provides the wireless device with the ability to choose between functional modes of an application based on either the existence of a given date/time result or on a level of confidence associated with the given date/time result. The logic may be accessed at any time, such as when an application is initially executed or after the initial execution, for example, when an application reaches an operation, or mode, requiring a date/time result. Thus, the described embodiments advantageously provide apparatus, methods and computer readable media that allow for managing license privileges on wireless devices, especially on wireless networks that do not require time to be synchronized between the network and the device.

Figure 1:
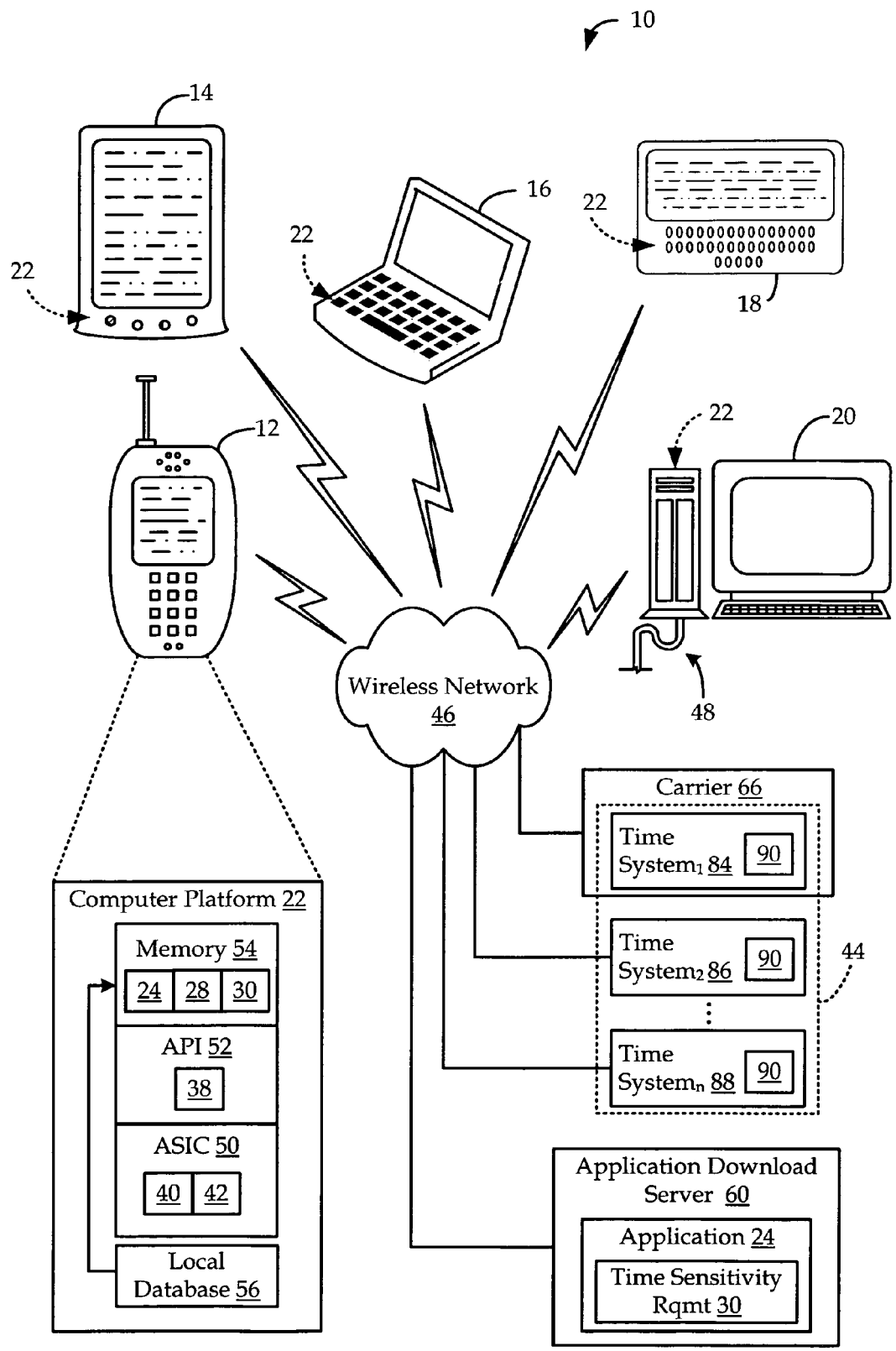
FIG. 1 is a schematic diagram of one embodiment of a system for managing time-sensitive licensing privileges on wireless devices.
Figure 2:
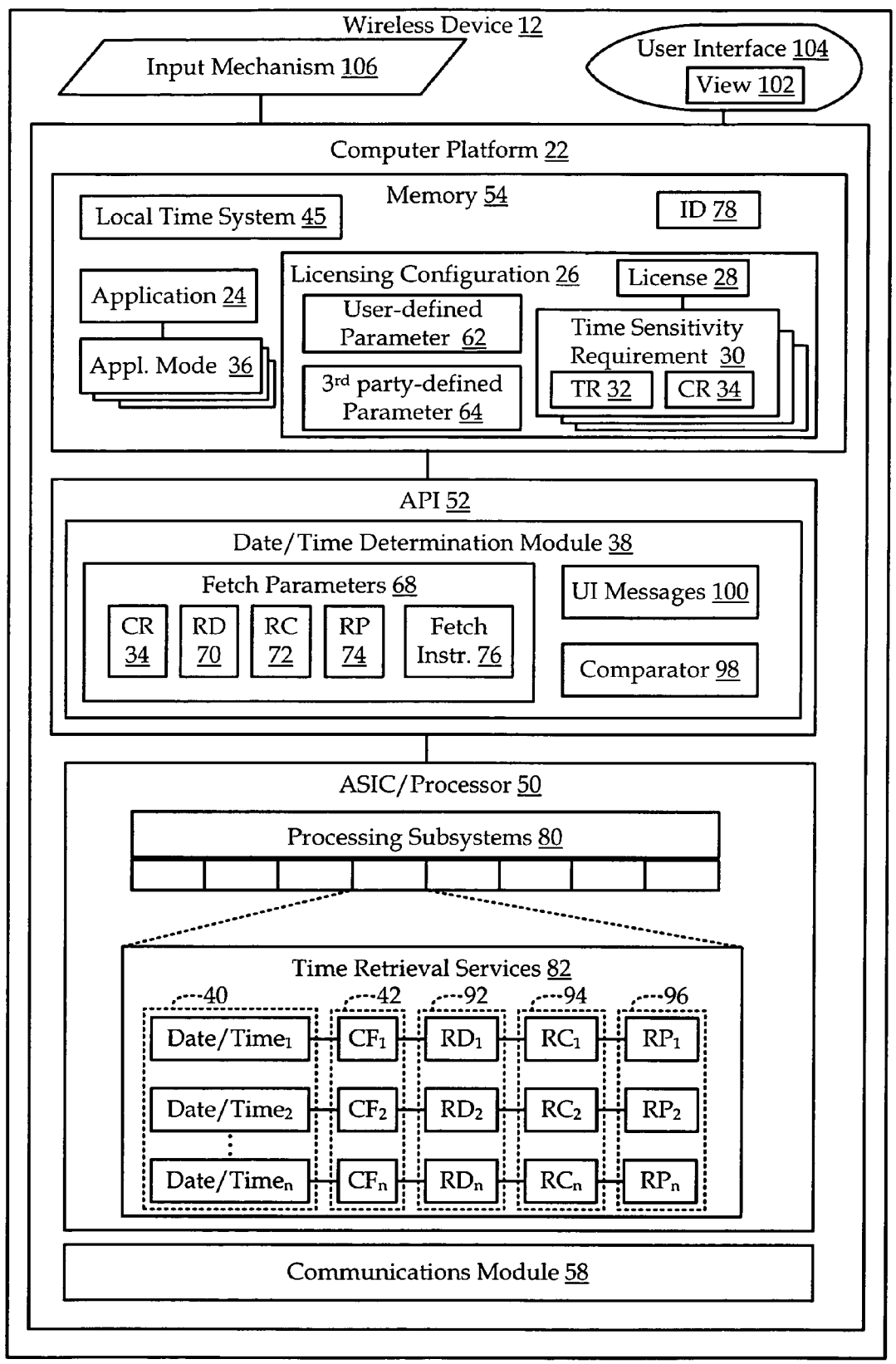
FIG. 2 is a schematic diagram of one embodiment of the wireless device of FIG. 1

Referring to FIGS. 1-2, one embodiment of an application license management system 10 comprises a plurality of wireless devices 12, 14, 16, 18, 20 each having a computer platform 22 operable to store and execute a time-sensitive licensed application 24. Licensed application 24 is associated with a licensing configuration 26 that includes a license 28 having a time sensitivity requirement 30. For example, time sensitivity requirement 30 includes a time requirement 32 (FIG. 2), such as a time period or an expiration date and/or time, that indicates when the respective wireless device is licensed to execute application 24. Further, time sensitivity requirement 30 includes a confidence requirement 34, such as a minimum confidence factor or level/type of authentication that indicates a threshold of trustworthiness associated with time requirement 32. As such, time sensitivity requirement 30 defines one or more levels of date/time authenticity and/or trustworthiness required to execute one or more modes 36, or levels of functionality, of licensed application 24. Additionally, each of the plurality of wireless devices 12, 14, 16, 18, 20 includes a date/time determination module 38 operable to retrieve a date/time result 40 having a confidence factor 42 indicating the accuracy, authenticity and/or trustworthiness of date/time result 40. For example, confidence factor 42 may be based upon a source of date/time result 40, where a trusted and/or authenticated source is associated with a higher confidence factor than an untrusted and/or unknown and/or unauthenticated source. Alternatively, confidence factor 42 may be based on the existence or absence of a date/time result 40 in the respective wireless device 12, 14, 16, 18, 20. For example, the existence of date/time result 40 may imply or be associated with a predetermined confidence factor, such as a 100% confidence, whereas the absence of date/time result 40 may imply a different predetermined confidence factor, such as 0%. In one embodiment, the source of date/time result 40 may include one or more remote time systems 44 in communication with the respective wireless device 12, 14, 16, 18, 20 across a wireless network 46, and a local time system 45 maintained on the respective wireless device. Thus, date/time determination module 38 is operable to compare date/time result 40 and confidence factor 42 with the corresponding time sensitivity requirement 30 in order to determine whether or not a license 28 for application 24 is in effect or is expired, and to determine whether or not to execute one or more modes 36 of licensed application 24.

The wireless devices can include any type of computerized, wireless devices, such as cellular telephone 12, personal digital assistant 14, laptop computer 16, two-way text pager 18, and even a separate computer platform 20 that has a wireless communication portal, and which also may have a wired connection 48 to a network or the Internet. The wireless device can be a remote-slave, or other device that does not have an end-user thereof but simply communicates data across the wireless network 46, such as a remote sensor, a diagnostic tool, a data relay, and the like. Thus, the apparatus, methods and computer readable media for the management of time-based licensing privileges on a wireless device can accordingly be performed on any form of wireless device or computer module including a wired or wireless communication portal, including without limitation, wireless modems, PCMCIA cards, access terminals, personal computers, telephones, asset tags, telemetry modules or any combination or sub-combination thereof.

Figure 3:
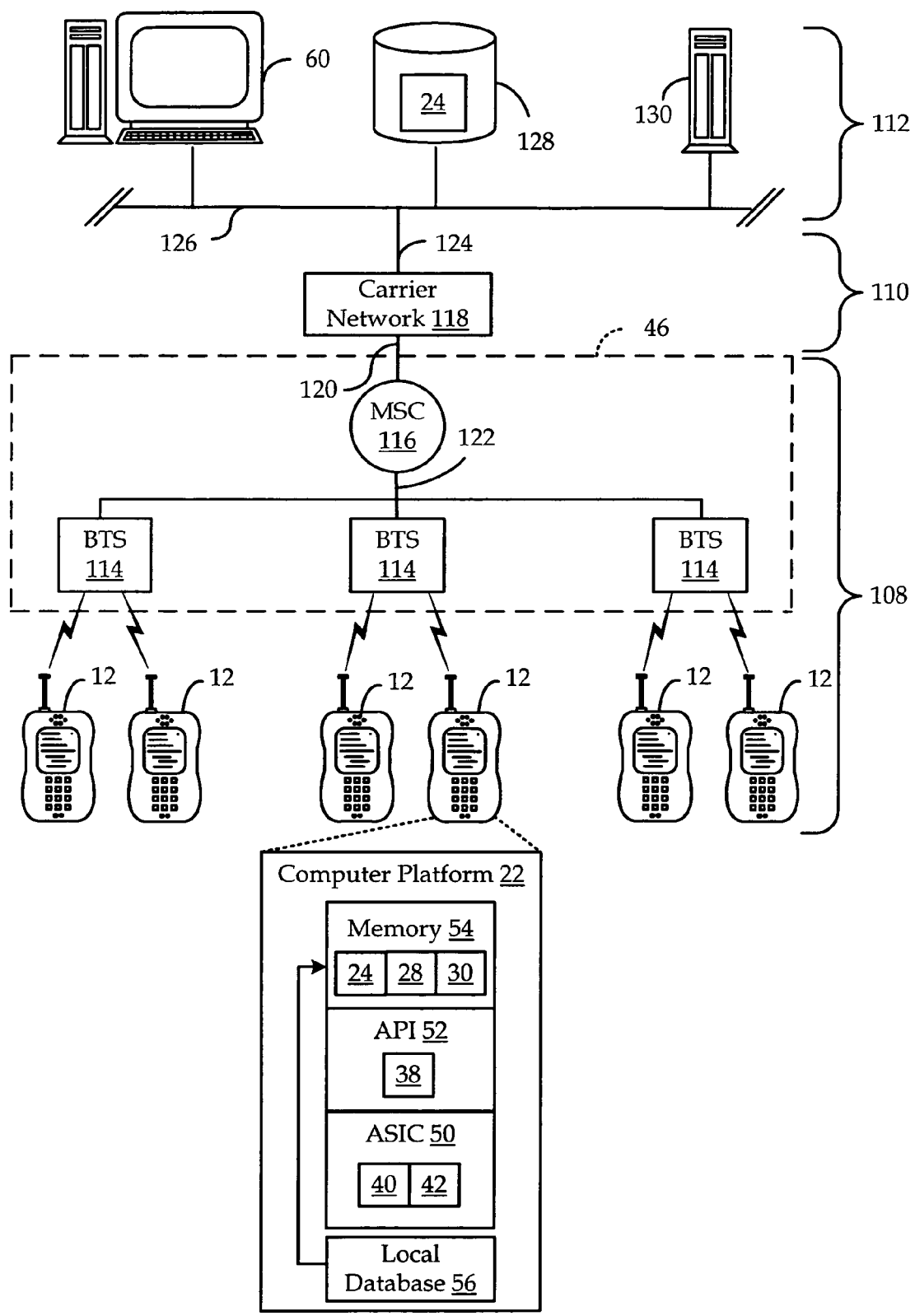
FIG. 3 is a schematic diagram of one embodiment of a cellular telephone embodiment of the system of FIG. 1.

Additionally referring to FIGS. 1-3, each wireless device 12, 14, 16, 18, 20, such as cellular telephone 12 in this case, has computer platform 22 that can transmit data across wireless network 46, and that can receive and execute software applications and display data transmitted from another computer device connected to wireless network 46. Computer platform 22 also includes an application-specific integrated circuit ("ASIC") 50, or other chipset, processor, logic circuit, or other data processing device. ASIC 50 or other processor may execute an application programming interface ("API") layer 52 that interfaces with any resident programs, such as licensed application 24, in a memory 54 of the wireless device. API 52 is a runtime environment executing on the respective wireless device 12, 14, 16, 18, 20. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices. Memory 54 may include read-only and/or random-access memory (RAM and ROM), EPROM, EEPROM, flash cards, or any memory common to computer platforms. Computer platform 22 also includes a local database 56 that can hold the software applications, files, or data not actively used in memory 54. Local database 56 typically includes one or more flash memory cells, but can be any secondary or tertiary storage device, such as magnetic media, EPROM, EEPROM, optical media, tape, or soft or hard disk. Additionally, local database 56 can ultimately hold a resident copy of licensed application 24. Further, computer platform 22 includes a communications module 58 that enables data communications between the various components of the respective wireless device 12, 14, 16, 18, 20, as well as providing for data communications between the respective wireless device and wireless network 46 and other computer devices connected to the wireless network.

In one embodiment, memory 54 includes licensed application 24 and its corresponding licensing configuration 26. Licensed application 24 may be any hardware, software/programs, firmware, logic and/or instructions executable by ASIC/processing engine 50 to perform some function on the respective wireless device. For example, licensed application 24 may include games, printed media, stock updates, news, word processing programs, data processing programs, graphics-related programs, media-related programs, communications-related programs, browser programs, or any other type of information or program operable on the respective wireless device. In one embodiment, referring to FIG. 1, application 24 is a software program received by the respective wireless device 12, 14, 16, 18, 20 from an application download server 60 located across wireless network 46.

As noted above, licensing configuration 26 includes the respective license 28 corresponding to application 24, as well as the associated time sensitivity requirements 30. License 28 can be copied to the respective wireless device from server 60 with application 24, or license 28 can be created on the respective wireless device as a file, key, or other resident object. Further, due to its limited timeframe, license 28 is associated with time sensitivity requirement 30, which includes time requirement 32 and confidence requirement 34. As noted above, time requirement 32 includes a time period or an expiration date and/or time, that indicates when the respective license 28 expires. Also, as noted above, confidence requirement 34 includes a minimum threshold of trustworthiness associated with time requirement 32. It should be noted that, in some embodiments, application 24 may have a plurality of application modes 36 corresponding to varying levels of operational functionality. In this case, there may be a corresponding plurality of time sensitivity requirements 30 each having differing levels of time requirements 32 and/or confidence requirements 34. For example, a basic application mode may provide for basic operational functionality of application 24, while an advanced application mode may provide for additional operational functionality. In turn, the basic application mode may correspond to a first set of time sensitivity requirements, while the advanced application mode may correspond to a second set of time sensitivity requirements. For example, the first set of time sensitivity requirements may allow licensed execution of the application for a longer period of time and/or may require a lower level of confidence in a date/time result than the second set of time sensitivity requirements. In this case, the selected one of the plurality of application modes 36 may be launched upon an initial execution of application 24 based on date/time result 40 and/or confidence factor 42. Alternatively, the selected one of the plurality of application modes 36 may be invoked based on date/time result 40 and/or confidence factor 42 retrieved after the initial execution of application 24, for example, when application 24 reaches an operation having time sensitivity requirement 30.

Additionally, licensing configuration 26 may also include user-defined parameters 62 and/or third party-defined parameters 64 that govern how date/time determination module 38 retrieves date/time result 40. User-defined parameters 62 include predetermined or real-time settings input by a user of the respective wireless device, while third party-defined parameters 64 include predetermined settings established by some third party, such as a wireless network carrier 66 or application download server 60, having some control over portions of the respective device and/or application 24. For example, both user-defined parameters 62 and third party-defined parameters 64 may define one or more of a plurality of fetch parameters 68 that dictate how date/time determination module 38 retrieves a given date/time result 40.

In one embodiment, plurality of fetch parameters 68 available for use by date/time determination module 38 include one or more of a confidence requirement parameter 34, a retrieval duration parameter 70, a retrieval cost parameter 72, a retrieval performance parameter 74, and additional fetch instructions 76. As noted above, confidence requirement parameter 34 includes a predetermined confidence factor 42, such as a minimum confidence factor, required to be associated with a given date/time result 40. Retrieval duration parameter 70 includes a predetermined time, such as a maximum time, to utilize in retrieving a given date/time result 40. Retrieval cost parameter 72 includes a predetermined monetary cost, such as a maximum cost, associated with retrieving a given date/time result 40. Retrieval performance parameter 74 includes a predetermined performance level, such as a minimum performance level, associated with the operational capabilities of the respective wireless device during the retrieval of a given date/time result 40. Additional fetch instructions 76 include any other parameters or guidelines to be followed by date/time determination module 38 in retrieving and/or determining a given date/time result 40.

For example, for a user wishing to minimize the delay prior to execution of the application, user-defined parameters 62 may be configured to direct date/time determination module 38 to retrieve a date/time result 40 associated with the fastest responding source. In another example, for a user worried about cost, user-defined parameters 62 may be configured to direct date/time determination module 38 to retrieve a date/time result 40 associated with the least cost source, or with a source that will not exceed a given maximum cost. In yet another example, since some of the sources of date/time result 40 may require more wireless device processing power than other sources, for a user concerned about maintaining a given level of wireless device operational performance, user-defined parameters 62 may be configured to direct date/time determination module 38 to retrieve a date/time result 40 associated with the least processor-intensive source. Similarly, for a third party wishing to guarantee a minimum confidence level, third party-defined parameters 64 may be configured to direct date/time determination module 38 to retrieve a date/time result 40 associated with a source achieving the defined minimum confidence requirement. It should be understood that the above examples are not to be construed as limiting, and that user-defined parameters 62 and third party-defined parameters 64 may include any combination of the plurality of fetch parameters 68, and such combinations may vary depending on the given situation.

Further, memory 54 may include a user/device identification ("ID") 78 that provides a unique and/or authenticatable identifier and/or description associated with the respective wireless device and/or the user of the respective device. Examples of ID 78 include a mobile identification number ("MIN"), a phone number, a user name, a social security number, an Internet Protocol ("IP") address, a subscriber identity module ("SIM"), a security identification module, any other type of tracking mechanism, and any combination thereof.

In one embodiment, some portion of third party-defined parameters 64 and/or time sensitivity requirements 30 may vary based on ID 78. For example, if ID 78 is associated with a user having a high dollar account with carrier 66, the carrier may set third-party defined parameters 64 in a manner to associate an increased confidence factor 42 with a user input date/time result 40 as compared to an ID 78 associated with a low dollar account. It should be understood that this is but one, non-limiting example and many other schemes may be utilized, depending on the given situation, whereby some portion of third party-defined parameters 64 and/or time sensitivity requirements 30 may vary based on ID 78.

Additionally, ASIC/processing engine 50 includes various processing subsystems 80 embodied in hardware, firmware, software, and combinations thereof, that enable the functionality of the respective wireless device 12, 14, 16, 18, 20 and the operability of the respective device on wireless network 46, such as for exchanging data/communications with other devices. For example, processing subsystems 80 may include one or any combination of subsystems such as: sound, non-volatile memory, file system, transmit, receive, searcher, physical layer, link layer, call processing layer, main control, remote procedure, handset, power management, diagnostic, digital signal processor, vocoder, messaging, call manager, Bluetooth®, Bluetooth® Location Position ("LPOS"), position determination, position engine, user interface, sleep, data services, security, authentication, USIM/SIM, voice services, graphics, universal serial bus ("USB"), camera/camcorder interface and associated display drivers, multimedia such as moving picture experts group ("MPEG") standard, general packet radio service ("GPRS") standard, etc.

In one embodiment, processing subsystems 80 include one or more time retrieval services 82 operable through communications module 58 to fetch a date/time result 40 from a remote or local source of time. For example, each time retrieval service 82 may be associated with a respective one of remotely-located time systems 44 or local time system 45. Remotely-located time systems 44 include, for example, a carrier-based time system 84, a trusted time server time system 86 and an unauthenticated time system 88. Carrier-based time system 84 may be, for example, a time server associated with carrier 66, such as the wireless network carrier that provides the respective wireless device 12, 14, 16, 18, 20 with access to all or portions of wireless network 46 for voice and/or data communications. Trusted time server time system 86 includes, for example, a time system associated with a trusted or authenticated third party. For example, trusted time server time system 86 may be a time source approved by the provider of the given application 24 as being a trustworthy provider of time. Unauthenticated time system 88 includes, for example, a source of time that is unapproved, unverified and/or unauthenticated, and therefore may have a lower level of trustworthiness when compared to carrier-based time system 84 and trusted time server time system 86. Local time system 45 may include, for example, a time system set by a user input and maintained in memory 54 on the respective wireless device. Further, each of carrier-based time system 84, a trusted time server time system 86 and unauthenticated time system 88 may provide a certificate 90, along with a date/time result 40, to indicate the source and/or authenticity of the time. For example, certificate 90 may include a digital signature, a hash, etc.

Additionally, as mentioned above, associated with each respective time retrieval service 82 is a date/time result 40 and a corresponding confidence factor 42. It should be noted that confidence factor 42 may be associated with the respective date/time result 40 by date/time determination module 38, by time retrieval service 82, by another processing subsystem 80, for example, based on the respective time system 44 or 45 supplying the respective date/time result or based on an associated certificate 90 indicating the authenticity and/or trustworthiness of the date/time result. Alternatively, confidence factor 42 may be supplied by the respective time system 44 or 45. Further, each respective time retrieval service 82 may include a retrieval duration factor 92, a retrieval cost factor 94 and a retrieval performance factor 96. Retrieval duration factor 92 comprises an actual or estimated time required to retrieve the corresponding date/time result 40. Retrieval cost factor 94 comprises an actual or estimated cost required to retrieve the corresponding date/time result 40. Retrieval performance factor 96 comprises an actual or estimated affect on data processing performance of the respective wireless device during retrieval the corresponding date/time result 40.

Date/time determination module 38, which may be any combination of hardware, software, firmware and executable logic, includes a comparator 98 operable to match a given configuration of fetch parameters 68 with each of the factors 42, 92, 94, 96 of the respective time retrieval services 82 in order to select one or more services and retrieve one or more date/time results 40. Alternatively, date/time determination module 38 may present the various factors 42, 92, 94, 96 in one of a plurality of user interface messages 100, presented in a view 102 on a user interface 104 of the respective wireless device 12, 14, 16, 18, 20. In this case, a user of the respective device may select one or more time retrieval service 82, such as by providing an input through an input mechanism 106, such as a keypad, touch display, voice recognition software, etc., on the device.

The plurality of user interface messages 100 may include any other information presentable to the user of the respective device during the operation of date/time determination module 38. For example, the plurality of user interface messages 100 may further include any combination of: a request to connect to a network to obtain a date/time result; a listing of available time retrieval services for obtaining a date/time result; a retrieved date/time result; a confidence factor; a retrieval duration factor; a retrieval cost factor; a retrieval performance factor; an actual retrieval duration; an actual retrieval cost; an actual retrieval performance; a message indicating the date/time retrieval is in process; etc.

Date/time determination module 38 is included as a portion of API 52. API 52 includes a class of software extensions that allow applications resident on computer platform 22, such as application 24, to access ASIC/processor 50. These software extensions can communicate with processing subsystems 80 on the wireless device, which allows both data reads and commands. For example, this software extension can send commands, including register for log messages, on behalf of the applications that invoke it. Each resident application on wireless device can create an instance of this new software extension to communicate with the subsystems independently. The module can then forward the responses of the subsystems to the requesting application, or across wireless network 46 to another computer device. For example, this capability allows application download server 60 and/or carrier 66, or any approved third party, to remotely monitor and/or control licensing privileges on the respective wireless device.

FIG. 3 is a more detailed schematic diagram of a cellular telephone embodiment of FIG. 1. The cellular wireless network and plurality of cellular telephones 12 of FIG. 3 are merely exemplary, and the disclosed embodiments can include any system whereby any remote modules, such as wireless devices 12, 14, 16, 17, 18, communicate over-the-air between and among each other and/or between and among components of a wireless network, including, without limitation, wireless network carriers and/or servers. FIG. 3 illustrates three main components, namely a wireless network area 108, a network interface 110, and a server environment 112. In addition, computer platform 22 pertaining to exemplary cellular telephones 12 is illustrated.

Wireless network area 108 is illustrated to include a plurality of cellular telephones 12. In addition, wireless network area 108 includes wireless network 46, as previously described with respect to FIG. 1. Here, wireless network 46 includes multiple base stations ("BTS") 114 and a mobile switching center ("MSC") 116.

MSC 116 may be connected to network interface 110, specifically its component carrier network 118, through either a wired or wireline connection network 120. For example, network 120 may comprise a data services network, a switched voice services network, often referred to as POTS ("plain old telephone service"), and/or a combination of both, including for example an Internet portion of a network for data information transfer and a POTS portion of a network for voice information transfer. For example, typically, in network 120, network or Internet portions transfers data, and the POTS portion transfers voice information transfer.

MSC 116 may also be connected to the multiple BTS's 114 by another network 122. Network 122 may carry data and/or switched voice information. For example, network 122 may comprise carry a data network, a voice network, and/or a combination of both, including for example an Internet portion of a network for data transfer and a POTS portion of a network for voice information transfer.

BTS 114 are wirelessly connected to exemplary cellular telephones 12 in wireless network area 108. For example, BTS 114 may ultimately broadcast messages wirelessly to cellular telephones 12 or receive messages wirelessly from cellular telephones 12, via switched voice services, data transfer services (including short messaging service ("SMS")), or other over-the-air methods.

As noted, the second main component of FIG. 3 is network interface 110. Specifically, network interface 110 is shown to include carrier network 118, data link 124 and local area network ("LAN") 126. The features and functions associated with data link 124 and LAN 126 are described below with reference to server environment 112.

Carrier network 118 is any regional, national or international network offering switched voice communication and/or data communication services. As such, carrier network 118 may include switched voice or data service provider communications facilities and lines, including data and/or switched voice information, or any combination of both, including for example an Internet portion of a network for data transfer and a POTS portion of a network for voice information transfer. In one embodiment, carrier network 118 controls messages, generally in the form of data packets, sent to or received from mobile switching center ("MSC") 116.

The third main component of FIG. 3 is server environment 112. In one embodiment, server environment 112 is the environment wherein the above described application download server 60 functions. As illustrated, server environment 112 may further include a separate data repository 128, and a data management server 130.

Application download server 60 can be in communication over LAN network 126 (of network interface 110) with separate data repository 128 for storing applications 24 and/or licensing configurations 26 to download to wireless devices. Further, data management server 130 may be in communication with application download server 60 to provide post-processing capabilities, data flow control, etc. Data management server 130 may be a network carrier server, for example, a server that manages user account information or a server that provides trustworthy date/time results. Application download server 60, data repository 128 and data management server 130 may be present on the illustrated network with any other network components that are needed to provide cellular telecommunication services. Application download server 60, data repository 128 and/or data management server 130 communicate with carrier network 118 through a data link 124 (of network interface 110) such as the Internet, a secure LAN, WAN, or other network.

Figure 4:
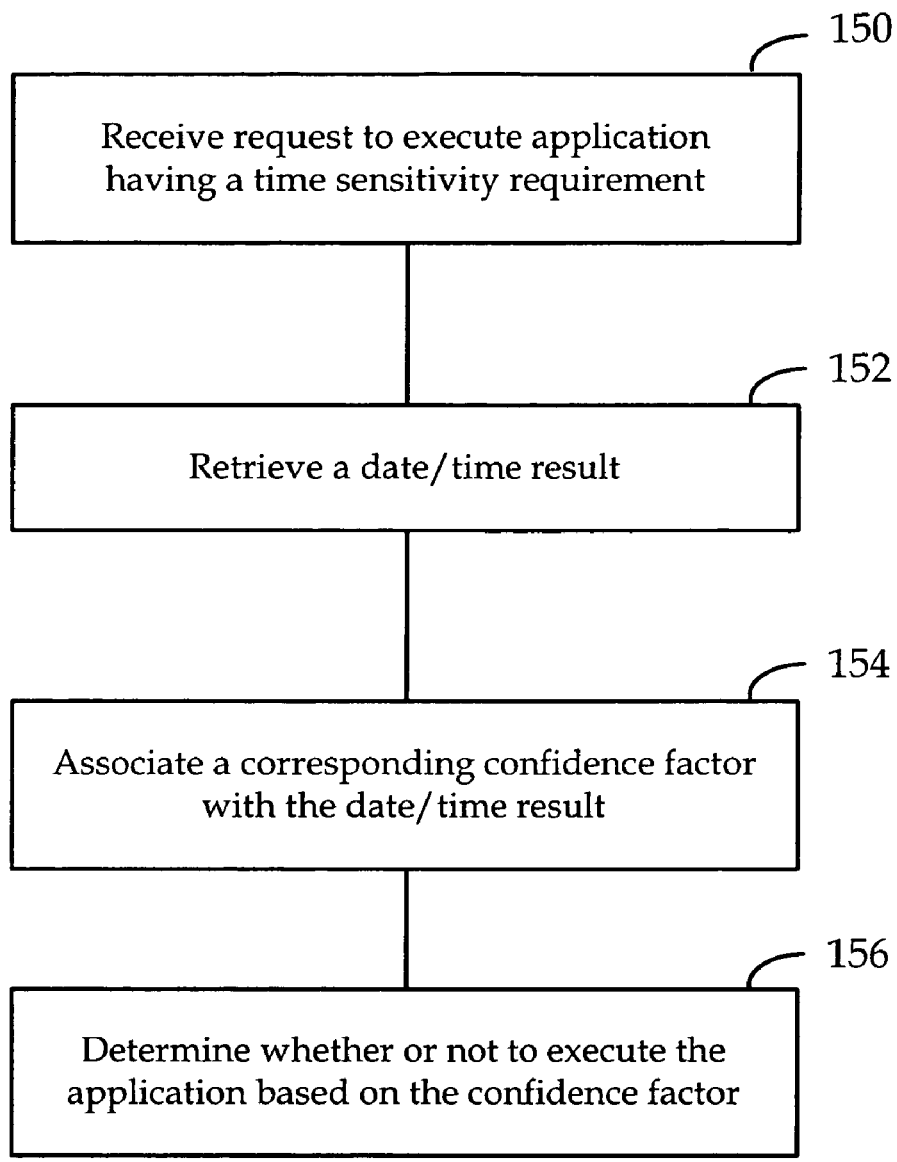
FIG. 4 is a flow diagram of one embodiment of a method of managing time-sensitive licensing privileges on a wireless device.

In operation, referring to FIG. 4, one embodiment of a method for managing time sensitive application privileges on a wireless device includes receiving a request to execute an application having a time sensitivity requirement (Block 150). For example, API 52 may control the launching of applications on the respective wireless device. When licensed application 24 is requested for launching, date/time determination module 38 receives the request to execute and application, and also receives or accesses the associated licensing configuration 26.

Based on licensing configuration 26, date/time determination module 38 then retrieves a date/time result 40 (Block 152). Date/time determination module 38 may utilize any of the factors associated with licensing configuration 26 to determine which time retrieval service 82 is utilized to fetch a date/time result 40. For example, comparator 98 may review the given configuration of fetch parameters 68, as well as the available time retrieval services 82, in order to find a service that matches the fetch configuration. In one embodiment, for example, date/time determination module 38 and the respective licensed application 24 communicate and automatically fetch a date/time result that complies with the given license 28 and time sensitivity requirements 30. In another embodiment, date/time determination module 38 automatically fetches a given date/time result 40 based on a user-defined parameter 62 or a third party-defined parameter 64. In another embodiment, date/time determination module 38 present the user of the respective wireless device with the available time retrieval services 82, along with their associated factors 42, 92, 94, 96, and then retrieves one or more date/time results 40 based on a selection input by the user.

Further, the method includes associating a corresponding confidence factor 42 with date/time result 40 (Block 154). As mentioned above, in one embodiment, this association may be performed by date/time determination module 38 based on a source, i.e. the respective time system 44 or 45, providing the given date/time result 40. Alternatively, the association may be based on a certificate 90 indicating a level of authenticity and/or trustworthiness of the given date/time result 40. It should be understood, however, that these examples are to be construed as non-limiting, and any scheme may be utilized to associate a given date/time 40 with a confidence factor 42.

Additionally, the method includes determining execution of the application based on the confidence factor 42 (Block 156). For example, date/time determination module 38 automatically initiates execution of licensed application 24 upon receipt of date/time result 40 that achieves the given fetch parameter configuration. In one embodiment, in order to determine whether or not to execute licensed application 24, date/time determination module 38 compares licensing configuration 26 with the retrieved date/time result 40 and its confidence factor 42 to ensure that the licensing configuration is achieved. In another embodiment, date/time determination module 38 passes the retrieved date/time result 40 and its associated confidence factor 42 to licensed application 24, which ensures that licensing configuration is achieved, and then sends an "execute" or "do not execute" command to date/time determination module 38 or API 52 to either execute the application or to provide user with a message indicating that the application is not executable based on the retrieved date/time result.

Figure 5:
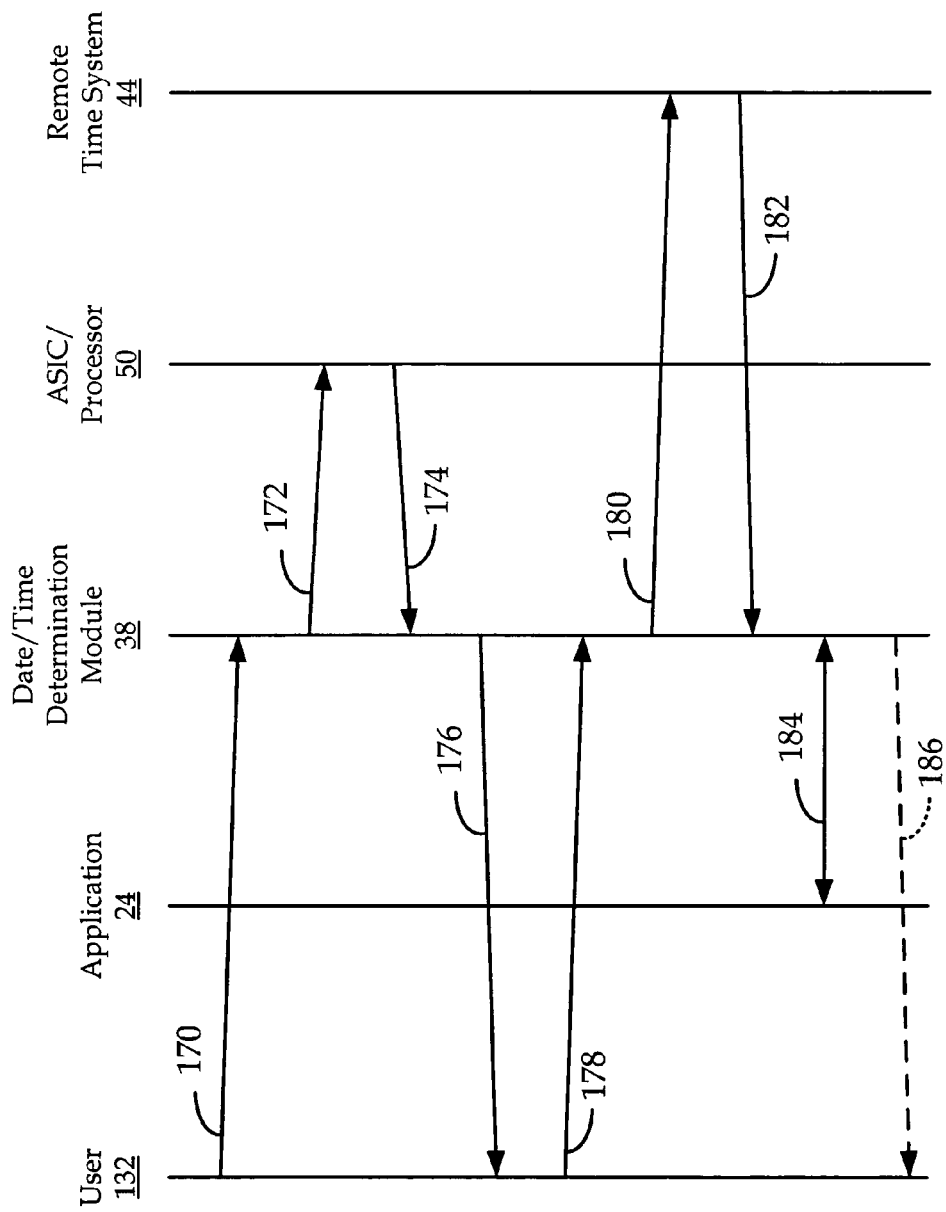
FIG. 5 is a schematic diagram of one embodiment of the message flow sequence between various components of the system of FIG. 1.

Referring to FIG. 5, in another specific example of the operation of the described embodiments, a user 132 of the respective wireless device 12, 14, 16, 18, 20 provides an input to input mechanism 106 (FIG. 2) that generates a launch application request message 170. Launch application request message 170 references a given licensed application 24, and hence the corresponding licensing configuration 26. As such, date/time determination module 38 ultimately receives this request, or receives an associated request for a date/time, and generates a date/time request message 172 that is received by ASIC/processor 50 or an associated operating system component of the respective wireless device. ASIC/processor 50 then supplies an initial reply message 174 to date/time determination module 38.

Initial reply message 174 may be any one of a plurality of messages relating to the current state of time maintained by the respective wireless device. For example, initial reply message 174 may be a message indicating that ASIC/processor 50 does not have any time. In this case, date/time determination module 38 sends user 132 an initial status message 176. For example, initial status message 176 is one of the plurality of user interface messages 100 in a view 102 that relays the fact that no time is currently available, and that requests permission to retrieve a date/time result 40 from a remote time system 44. In another embodiment, initial reply message 174 may be a list of available time retrieval services 83 and their associated factors 42, 92, 94 and 96. In this case, date/time determination module 38 generates initial status message 176, which is one of the plurality of user interface messages 100 in a view 102, indicating the available time retrieval services 83 and their associated factors 42, 92, 94 and 96, and prompts user 132 for a selection.

Upon receiving initial status message 176, user 132 may then provide a user selection message 178 indicating a choice of the user as to how to proceed. Continuing with the above-listed examples, user selection message 178 may indicate a permission to utilize a remote time system 44 in the retrieval of date/time result 40, or may indicate a selected time retrieval service 82 based on a user's desired confidence factor, retrieval duration, retrieval cost, and/or retrieval performance. For example, if user 132 only desires to utilize a basic functional mode 36 of application 24, the user may select one of a plurality of time retrieval services 82 having a relatively low confidence factor 42 compared to other services that have higher confidence factors that meet a higher threshold corresponding to a more advanced function mode 36.

In any case, date/time determination module 38 then generates a date/time request message 180 based on the received user selection message 178. The respective wireless device processes this date/time request message 180 and transmits it across wireless network 46 to a corresponding remote time system 44. In turn, the respective remote time system 44 returns a date/time response message 182, which includes at least date/time result 40, and may also include confidence factor 42, certificate 90 and/or any other associated factor relating to the retrieval of the date/time result. If the received date/time result 40 and the associated confidence factor 42 meet the licensing configuration 26, then date/time determination module 38 executes licensed application 24 (message 184). If the received date/time result 40 and the associated confidence factor 42 do not meet the licensing configuration 26, or if no date/time result 40 and/or confidence factor 42 is received, then date/time determination module 38 sends a status message 186 to user 132. In this case, status message 186, which is one of the plurality of user interface messages 100 in a view 102, indicating, for example, that licensed application 24 cannot be executed.

It should be understood that the above message sequence is but one of a plurality of message sequence scenarios, and that many alternatives exist depending on the given situation. For example, rather than initially communicating with user 132 (i.e. messages 176 and 178), date/time determination module 38 may automatically retrieve a date/time result 40 based on an associated licensing configuration 26.

While the various disclosed embodiments have been illustrated and described, it will be clear that the subject matter of this document is not limited to these embodiments only. Numerous other modifications, changes, variations, substitutions and equivalents will be apparent to those skilled in the art without departing from the spirit and scope of the disclosed embodiments as described in the claims.

What is claimed is:

1. A method of managing time sensitive application privileges on a wireless device, comprising:
   receiving a request to execute an application having a time sensitivity requirement at the wireless device, a date/time maintained at the wireless device not being synchronized with a date/time maintained at a wireless network with which the wireless device is associated;
   retrieving a date/time result from a source;
   associating a corresponding confidence factor with the date/time result, wherein the corresponding confidence factor indicates a degree to which the source of the date/time result is trusted to provide authentic date/time information; and
   determining execution of the application based on the date/time result and the corresponding confidence factor, wherein the application has a plurality of functional modes each corresponding to one of a plurality of confidence requirements, and executing the respective one of the plurality of functional modes based on a match between a confidence factor associated with the date/time result and a respective one of the plurality of confidence requirements.

2. The method of claim 1 where the time sensitivity requirement further comprises a confidence requirement, and further comprising executing the application if the confidence factor achieves the confidence requirement.

3. The method of claim 2, further comprising selecting one time retrieval service from a plurality of time retrieval services that each provide a corresponding one of a plurality of date/time results and a corresponding one of a plurality of confidence factors such that the confidence factor of the selected time retrieval service achieves the confidence requirement.

4. The method of claim 1, where the act of retrieving at least one date/time result further comprises at least one of receiving the date/time result from a time system across a wireless network, and receiving the date/time result from a manual user input into the wireless device.

5. The method of claim 4, where the time system is selected from the group consisting of a global positioning system, an assisted global positioning system, a trusted time server, and a wireless network carrier server.

6. The method of claim 1, where the act of retrieving at least one date/time result further comprises retrieving a plurality of date/time results, where each of the plurality of date/time results have a corresponding one of a plurality of confidence factors, and further comprising selecting one of the plurality of date/time results based on the corresponding one of the plurality of confidence factors.

7. The method of claim 1, where the act of retrieving at least one date/time result further comprises selecting one of a plurality of date/time services to provide the date/time result.

8. The method of claim 7, where the act of selecting one of the plurality of date/time services is based on a corresponding one of a plurality of fetch parameters.

9. The method of claim 8, where the plurality of fetch parameters are selected from the group consisting of a confidence factor, a retrieval duration, a retrieval cost, and a retrieval performance.

10. The method of claim 8, where the act of selecting one of the plurality of date/time services further comprises receiving a user input of a selected date/time service.

11. The method of claim 1, where the act of associating the corresponding confidence factor with the date/time result further comprises determining the confidence factor based on a source of the date/time result.

12. The method of claim 1, where the act of associating the corresponding confidence factor with the date/time result further comprises receiving the confidence factor from a source of the date/time result.

13. The method of claim 1, further comprising generating a user prompt asking a user to input a selection of a time retrieval service, the user prompt comprising a plurality of time retrieval services and at least one fetch parameter corresponding to each of the plurality of time retrieval services, the fetch parameter selected from the group consisting of a confidence factor, a retrieval duration, a retrieval cost, and a retrieval performance.

14. The method of claim 1, where the act of retrieving at least one date/time result further comprises receiving the date/time result from a time service across a wireless network, where the date/time result further comprises a guarantee of authenticity.

15. The method of claim 1, wherein retrieving the date/time result comprises retrieving no date/time result, and further comprising associating a predetermined confidence factor with at least one of a retrieved date/time result and no date/time result.

16. A non-transitory computer-readable storage medium having stored thereon at least one sequence of instructions which when executed by a processor causes the processor to perform the acts of:
receiving a request to execute an application having a time sensitivity requirement;
retrieving a date/time result from a source;
associating a corresponding confidence factor with the date/time result, wherein the corresponding confidence factor indicates a degree to which the source of the date/time result is trusted to provide authentic date/time information; and
determining execution of the application based on confidence factor, wherein the application has a plurality of functional modes each corresponding to one of a plurality of confidence requirements, and execution of the instructions by a processor causes the processor to further perform the act of executing the respective one of the plurality of functional modes based on a match between a confidence factor associated with the date/time result and a respective one of the plurality of confidence requirements.

17. The non-transitory computer-readable storage medium of claim 16, wherein the time sensitivity requirement further comprises a confidence requirement, and wherein execution of the instructions by a processor causes the processor to further perform the act of executing the application if the confidence factor achieves the confidence requirement.

18. The non-transitory computer-readable storage medium of claim 17, wherein execution of the instructions by a processor causes the processor to further perform the act of selecting one time retrieval service from a plurality of time retrieval services that each provide a corresponding one of a plurality of date/time results and a corresponding one of a plurality of confidence factors such that the confidence factor of the selected time retrieval service achieves the confidence requirement.

19. The non-transitory computer-readable storage medium of claim 16, wherein execution of the instructions by a processor causes the processor to further perform at least one of receiving the date/time result from a time system across a wireless network, and receiving the date/time result from a manual user input into the wireless device.

20. The non-transitory computer-readable storage medium of claim 19, wherein the time system is selected from the group consisting of a global positioning system, an assisted global positioning system, a trusted time server, and a wireless network carrier server.

21. The non-transitory computer-readable storage medium of claim 16, wherein execution of the instructions by a processor causes the processor to further perform the acts of:
retrieving a plurality of date/time results, wherein each of the plurality of date/time results has a corresponding one of a plurality of confidence factors; and
selecting one of the plurality of date/time results based on the corresponding one of the plurality of confidence factors.

22. The non-transitory computer-readable storage medium of claim 16, wherein execution of the instructions by a processor causes the processor to further perform the act of selecting one of a plurality of date/time services to provide the date/time result.

23. The non-transitory computer-readable storage medium of claim 22, wherein the act of selecting one of the plurality of date/time services is based on a corresponding one of a plurality of fetch parameters.

24. The non-transitory computer-readable storage medium of claim 23, wherein the plurality of fetch parameters are selected from the group consisting of a confidence factor, a retrieval duration, a retrieval cost, and a retrieval performance.

25. The non-transitory computer-readable storage medium of claim 24, wherein execution of the instructions by a processor causes the processor to further perform the act of receiving a user input of a selected date/time service.

26. The non-transitory computer-readable storage medium of claim 16, wherein execution of the instructions by a processor causes the processor to further perform the act of determining the confidence factor based on the source of the date/time result.

27. The non-transitory computer-readable storage medium of claim 16, wherein execution of the instructions by a processor causes the processor to further perform the act of receiving the confidence factor from the source of the date/time result.

28. The non-transitory computer-readable storage medium of claim 16, wherein execution of the instructions by a processor causes the processor to further perform the act of generating a user prompt asking a user to input a selection of a time retrieval service, the user prompt comprising a plurality of time retrieval services and at least one fetch parameter corresponding to each of the plurality of time retrieval services, the fetch parameter selected from the group consisting of a confidence factor, a retrieval duration, a retrieval cost, and a retrieval performance.

29. The non-transitory computer-readable storage medium of claim 16, wherein the act of retrieving a date/time result further comprises receiving the date/time result from a time service across a wireless network, where the date/time result further comprises a guarantee of authenticity.

30. The non-transitory computer-readable storage medium of claim 16, wherein retrieving the date/time result comprises retrieving no date/time result, and further comprising associating a predetermined confidence factor with at least one of a retrieved date/time result and no date/time result.

31. A wireless device, comprising:
a means for receiving a request to execute an application having a time sensitivity requirement;

a means for retrieving a date/time result from a source;
a means for associating a corresponding confidence factor with the date/time result, wherein the corresponding confidence factor indicates a degree to which the source of the date/time result is trusted to provide authentic date/time information; and
a means for determining execution of the application based on the confidence factor, wherein the application has a plurality of functional modes each corresponding to one of a plurality of confidence requirements, and means for executing the respective one of the plurality of functional modes based on a match between a confidence factor associated with the date/time result and a respective one of the plurality of confidence requirements.

32. The wireless device of claim 31, wherein the time sensitivity requirement further comprises a confidence requirement, the wireless device further comprising a means for executing the application if the confidence factor achieves the confidence requirement.

33. The wireless device of claim 32, further comprising a means for selecting one time retrieval service from a plurality of time retrieval services that each provide a corresponding one of a plurality of date/time results and a corresponding one of a plurality of confidence factors such that the confidence factor of the selected time retrieval service achieves the confidence requirement.

34. The wireless device of claim 31, further comprising:
means for receiving the date/time result from a manual user input into the wireless device,
wherein the means for retrieving a date/time result comprises a means for receiving the date/time result from a time system across a wireless network.

35. The wireless device of claim 34, wherein the time system is selected from the group consisting of a global positioning system, an assisted global positioning system, a trusted time server, and a wireless network carrier server.

36. The wireless device of claim 31, further comprising:
means for selecting one of the plurality of date/time results based on the corresponding one of the plurality of confidence factors,
wherein the means for retrieving a date/time result further comprises a means for retrieving a plurality of date/time results, wherein each of the plurality of date/time results has a corresponding one of a plurality of confidence factors.

37. The wireless device of claim 31, wherein the means for retrieving a date/time result further comprises a means for selecting one of a plurality of date/time services to provide the date/time result.

38. The wireless device of claim 37, wherein the means for selecting one of the plurality of date/time services comprises means for selecting one of the plurality of date/time services based on a corresponding one of a plurality of fetch parameters.

39. The wireless device of claim 38, wherein the plurality of fetch parameters are selected from the group consisting of a confidence factor, a retrieval duration, a retrieval cost, and a retrieval performance.

40. The wireless device of claim 38, wherein the means for selecting one of the plurality of date/time services further comprises a means for receiving a user input of a selected date/time service.

41. The wireless device of claim 31, wherein the means for associating the corresponding confidence factor with the date/time result further comprises a means for determining the confidence factor based on a source of the date/time result.

42. The wireless device of claim 31, wherein the means for associating the corresponding confidence factor with the date/time result further comprises a means for receiving the confidence factor from a source of the date/time result.

43. The wireless device of claim 31, further comprising:
a means for generating a user prompt asking a user to input a selection of a time retrieval service, the user prompt comprising a plurality of time retrieval services and at least one fetch parameter corresponding to each of the plurality of time retrieval services, the fetch parameter selected from the group consisting of a confidence factor, a retrieval duration, a retrieval cost, and a retrieval performance.

44. The wireless device of claim 31, wherein the means for retrieving at least one date/time result further comprises a means for receiving the date/time result from a time service across a wireless network, where the date/time result further comprises a guarantee of authenticity.

45. A wireless device, comprising:
a computer platform operable to execute an application having a time sensitivity requirement, a date/time maintained at the wireless device not being synchronized with a date/time maintained at a wireless network with which the wireless device is associated;
a time retrieval service resident on the computer platform and operable to retrieve a date/time result from a source; and
a date/time determination module resident on the computer platform and operable to associate a corresponding confidence factor with the date/time result, wherein the corresponding confidence factor indicates a degree to which the source of the date/time result is trusted to provide authentic date/time information, and determine an execution of the application based on the date/time result and the corresponding confidence factor, wherein the application has a plurality of functional modes each corresponding to one of a plurality of confidence requirements, and executing the respective one of the plurality of functional modes based on a match between a confidence factor associated with the date/time result and a respective one of the plurality of confidence requirements.

46. The device of claim 45, wherein the time sensitivity requirement further comprises a confidence requirement, and wherein the computer platform is further operable to execute the application if the confidence factor achieves the confidence requirement.

47. The device of claim 46, further comprising a plurality of time retrieval services resident on the computer platform each operable to provide a corresponding one of a plurality of date/time results and a corresponding one of a plurality of confidence factors, wherein the date/time determination module is operable to select one time retrieval service from the plurality of time retrieval services such that the confidence factor of the selected time retrieval service achieves the confidence requirement.

48. The device of claim 45 wherein the confidence factor associated with the date/time result is received from a source of the date/time result.

49. The device of claim 45, wherein the time retrieval service is operable to retrieve the date/time result in response to an attempted execution of the application.

50. The device of claim 45, wherein the date/time determination module is operable to select one time retrieval service based on at least one of an application requirement, a carrier network requirement, a manual user input, and at least one fetch parameter.

51. The device of claim 45, wherein the fetch parameter is selected from the group consisting of a confidence factor, a retrieval duration, a retrieval cost, and a retrieval performance.

52. The device of claim 45, wherein the time retrieval service is operable to retrieve the date/time result from at least one of a time system across a wireless network on which the wireless device is operable and from a manual user input into the wireless device.

53. The device of claim 52, wherein the time system is selected from the group consisting of a global positioning system, an assisted global positioning system, a trusted time server, and a wireless network carrier server.

54. The device of claim 45, wherein the date/time determination module is operable to associate a confidence factor with the date/time result based on a source of the date/time result.

55. The device of claim 45, wherein the date/time determination module is further operable to generate a user prompt asking a user to input a selection of a time retrieval service, the user prompt comprising a plurality of time retrieval services and at least one fetch parameter corresponding to each of the plurality of time retrieval services, the fetch parameter selected from the group consisting of a confidence factor, a retrieval duration, a retrieval cost, and a retrieval performance.

56. The device of claim 45, wherein the date/time determination module is further operable to receive the date/time result from a time service across a wireless network on which the wireless device is operable, wherein the date/time result further comprises a guarantee of authenticity.

57. The device of claim 45, wherein the date/time result comprises at least one of a retrieved date/time result and no date/time result, and wherein the date/time determination module is operable to associate a predetermined confidence factor with at least one of the retrieved date/time result and no date/time result.

58. A method of managing time sensitive application privileges on a wireless device, comprising:
receiving a request to execute an application having a time sensitivity requirement at the wireless device, a date/time maintained at the wireless device not being synchronized with a date/time maintained at a wireless network with which the wireless device is associated;
retrieving a date/time result from a source;
associating a corresponding confidence factor with the date/time result;
determining a confidence requirement of the time sensitivity requirement; and
determining execution of the application based on the date/time result and whether the corresponding confidence factor achieves the confidence requirement, wherein the application has a plurality of functional modes each corresponding to one of a plurality of confidence requirements, and executing the respective one of the plurality of functional modes based on a match between a confidence factor associated with the date/time result and a respective one of the plurality of confidence requirements.

\* \* \* \* \*